US010536102B2

(12) United States Patent
Kishioka et al.

(10) Patent No.: US 10,536,102 B2
(45) Date of Patent: Jan. 14, 2020

(54) ELECTRIC POWER STEERING CONTROL APPARATUS AND ELECTRIC POWER STEERING CONTROL METHOD

(71) Applicant: Mitsubishi Electric Corporation, Tokyo (JP)

(72) Inventors: Hiroyuki Kishioka, Tokyo (JP); Susumu Zeniya, Tokyo (JP); Takashi Goto, Tokyo (JP); Daisuke Tanaka, Tokyo (JP); Akiyoshi Takashima, Tokyo (JP); Eiji Iwami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/569,150

(22) PCT Filed: May 1, 2015

(86) PCT No.: PCT/JP2015/063061
§ 371 (c)(1),
(2) Date: Oct. 25, 2017

(87) PCT Pub. No.: WO2016/178262
PCT Pub. Date: Nov. 10, 2016

(65) Prior Publication Data
US 2018/0145622 A1    May 24, 2018

(51) Int. Cl.
H02P 21/22    (2016.01)
H02P 29/68    (2016.01)
(Continued)

(52) U.S. Cl.
CPC ............ H02P 21/22 (2016.02); B62D 5/0463
(2013.01); B62D 6/02 (2013.01); B62D 6/10
(2013.01);
(Continued)

(58) Field of Classification Search
CPC ........ B62D 5/046; B62D 5/0463; B62D 6/02;
B62D 6/10; H02P 21/22; H02P 29/68;
H02P 27/12
(Continued)

(56) References Cited

U.S. PATENT DOCUMENTS

2005/0162113 A1    7/2005  Fujimoto et al.
2009/0234538 A1*   9/2009  Ta ......................... B62D 5/046
                                                      701/41
(Continued)

FOREIGN PATENT DOCUMENTS

JP    2003-52199 A    2/2003
JP    2005-218197 A   8/2005
(Continued)

OTHER PUBLICATIONS

International Search Report for PCT/JP2015/063061, dated Aug. 11, 2015.

Primary Examiner — Bickey Dhakal
Assistant Examiner — Zemenay T Truneh
(74) Attorney, Agent, or Firm — Sughrue Mion, PLLC; Richard C. Turner

(57) ABSTRACT

A main controller includes: a d-axis current limiter configured to calculate a d-axis current limiting value with priority, based on a dq-converted current limiting value, and calculate a limited d-axis current command value by clipping the d-axis current command value to be the d-axis current limiting value or less; a q-axis current limiter configured to calculate a q-axis current limiting value, based on the dq-converted current limiting value and the limited d-axis current command value, and calculate a limited q-axis current command value by clipping the q-axis current command value to be the q-axis current limiting value or less; and an inverter controller configured to control motor cur-
(Continued)

rent, based on the limited d-axis current command value and the limited q-axis current command value.

9 Claims, 5 Drawing Sheets

(51) Int. Cl.
 *B62D 5/04* (2006.01)
 *B62D 6/02* (2006.01)
 *B62D 6/10* (2006.01)
 *H02P 27/12* (2006.01)
(52) U.S. Cl.
 CPC .............. *H02P 27/12* (2013.01); *H02P 29/68* (2016.02); *B62D 5/046* (2013.01)
(58) Field of Classification Search
 USPC ......................................... 318/400.2; 701/41
 See application file for complete search history.

(56) References Cited

U.S. PATENT DOCUMENTS

| | | | |
|---|---|---|---|
| 2009/0256503 A1* | 10/2009 | Ueda | ........................ H02P 6/06 318/400.02 |
| 2011/0025238 A1 | 2/2011 | Ueda et al. | |
| 2013/0249449 A1 | 9/2013 | Uematsu et al. | |
| 2015/0015171 A1* | 1/2015 | Nishibata | ................ H02P 21/14 318/400.15 |

FOREIGN PATENT DOCUMENTS

| | | |
|---|---|---|
| JP | 2008-86138 A | 4/2008 |
| JP | 2013-74648 A | 4/2013 |
| JP | 5224032 B2 | 7/2013 |
| JP | 2013-226033 A | 10/2013 |
| JP | 2014-17924 A | 1/2014 |
| WO | 2009/123113 A1 | 10/2009 |

* cited by examiner

ELECTRIC POWER STEERING CONTROL APPARATUS AND ELECTRIC POWER STEERING CONTROL METHOD

CROSS REFERENCE TO RELATED APPLICATIONS

This application is a National Stage of International Application No. PCT/JP2015/063061 filed May 1, 2015, the contents of all of which are incorporated herein by reference in their entirety.

TECHNICAL FIELD

The present invention relates to an electric power steering control apparatus and an electric power steering control method, and more particularly to computing a current command value for controlling the driving of an AC motor which assists in the steering of a steering wheel.

BACKGROUND ART

In a conventional electric power steering control apparatus, a command value of an assist torque, which is output to an AC motor, is determined by a current value on the q-axis (hereafter called q-axis current command value), and a current value on the d-axis (hereafter called d-axis current command value) based on the weak field control of the AC motor, in order to improve the follow-up performance of the steering wheel during high-speed steering.

When predetermined conditions are established and the q-axis current command value must be limited, the conventional electric power steering control apparatus limits not only the q-axis current command value, but also limits the d-axis current command value at the same rate as the case of limiting the q-axis current command value in order to improve the sensation of steering (e.g. see PTL 1).

CITATION LIST

Patent Literature

[PTL 1] Japanese Patent No. 5224032

SUMMARY OF INVENTION

Technical Problem

Prior art, however, has the following problems.

FIG. 5 shows graphs depicting the relationship of the d-axis current command value with respect to the motor rotation speed, and the relationship of the maximum value of the assist torque with respect to the motor rotation speed in the conventional electric power steering control apparatus. When a predetermined motor rotation speed is N1 or greater, at which the counter electromotive force of the motor exceeds the power supply voltage, the maximum value of the assist torque drops. In concrete terms, the conventional electric power steering control apparatus outputs the d-axis current command value based on the motor rotation speed, so as to suppress a drop in the maximum value of the assist torque.

As depicted in FIG. 5, if the required d-axis current command value becomes insufficient when the rotation speed is N2 or more, due to a certain limitation issue, this causes a drop in the maximum value of the assist torque at the rotation speed N2 or more.

Further, in the case of the conventional electric power steering control apparatus, if a predetermined condition is established and the q-axis current command value is limited, the d-axis current command value is also limited at the same rate as this limitation. Therefore if the steering wheel is moving rapidly, the d-axis current command value may become insufficient and the followability may drop.

With the foregoing in view, it is an object of the present invention to provide an electric power steering control apparatus and an electric power steering control method, which can improve the followability of the prior art when current limit to the AC motor, to assist the steering of the steering wheel, is limited in a high-speed steering range.

Solution to Problem

An electric power steering control apparatus according to the present invention is an electric power steering control apparatus having a main controller configured to control motor current for driving an AC motor assisting steering of a steering wheel, based on a d-axis current command value and a q-axis current command value, wherein the main controller includes, when a dq-converted current command value, which is a root-sum-square of the d-axis current command value and the q-axis current command value, is limited: a d-axis current limiter configured to calculate a d-axis current limiting value with priority, based on a dq-converted current limiting value, which is a limiting value of the dq-converted current command value, and calculate a limited d-axis current command value by clipping the d-axis current command value to be the d-axis current limiting value or less; a q-axis current limiter configured to calculate a q-axis current limiting value, based on the dq-converted current limiting value and the limited d-axis current command value calculated by the d-axis current limiter, and calculate a limited q-axis current command value by clipping the q-axis current command value to be the q-axis current limiting value or less; and an inverter controller configured to control the motor current, based on the limited d-axis current command value and the limited q-axis current command value.

An electric power steering control method according to this invention is an electric power steering method executed by a main controller controlling motor current for driving an AC motor assisting steering of a steering wheel, based on a d-axis current command value and a q-axis current command value, the method including: with the use of the main controller, when a dq-converted current command value, which is a root-sum-square of the d-axis current command value and the q-axis current command value, is limited: a first step of acquiring a dq-converted current limiting value, which is a limiting value of the dq-converted current command value; a second step of calculating a d-axis current limiting value with priority, based on the dq-converted current limiting value acquired in the first step; a third step of calculating a limited d-axis current command value by clipping the d-axis current command value to be not more than the d-axis current limiting value, which has been calculated in the second step; a fourth step of calculating a q-axis current limiting value, based on the dq-converted current limiting value acquired in the first step and the limited d-axis current command value calculated in the third step; a fifth step of calculating a limited q-axis current command value by clipping the q-axis current command value to be not more than the q-axis current limiting value, which has been calculated in the fourth step; and a sixth step of controlling the motor current, based on the limited d-axis current command value, which has been calculated in the third step, and the limited q-axis current command value, which has been calculated in the fifth step.

Advantageous Effects of Invention

According to this invention, when current is limited while using the steering wheel, the d-axis current command value can be output, regardless the limiting rate of the q-axis current value, if the d-axis current command value is the d-axis current limiting value or less, and the d-axis current command value is calculated with priority over the q-axis current command value. By including this configuration, the limiting of the d-axis current command value can be more relaxed than prior art in a high rotation speed range of the AC motor. As a result, an electric power steering control apparatus and an electric power steering control method, which can improve the followability more than prior art, can be provided.

DESCRIPTION OF EMBODIMENTS

Embodiments of an electric power steering control apparatus and an electric power steering control method of this invention will now be described with reference to the drawings.

Embodiment 1

Figure 1:
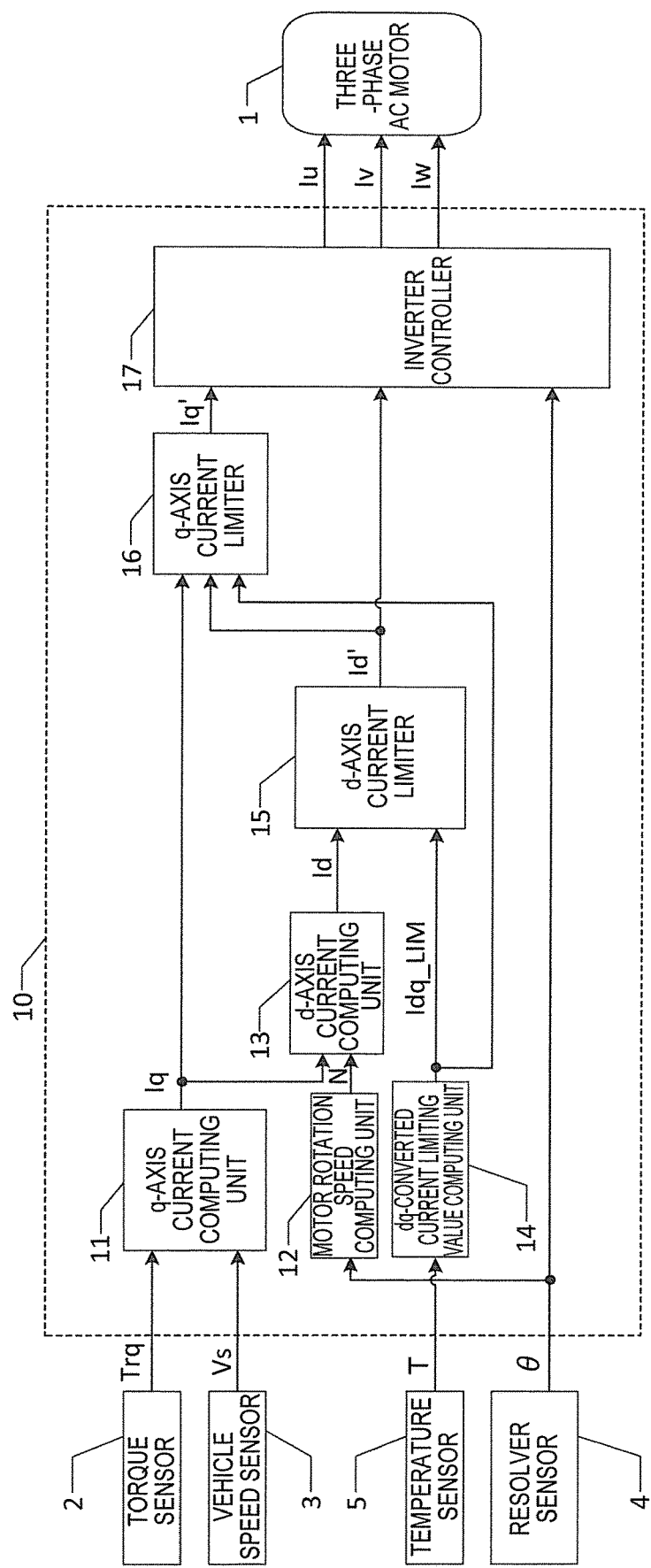
FIG. 1 is a general block diagram of an electric power steering control apparatus according to Embodiment 1 of this invention.

FIG. 1 is a general block diagram depicting an electric power steering control apparatus according to Embodiment 1 of this invention. In concrete terms, the electric power steering control apparatus depicted in FIG. 1 is constituted by: a main controller 10 (hereafter ECU 10) which is installed in a vehicle for controlling electric power steering; a motor 1 which assists the steering of the steering wheel; a torque sensor 2 which is installed near the steering wheel and detects the steering torque; a vehicle speed sensor 3 which detects the vehicle speed; a resolver sensor 4 which detects the rotation angle of the motor 1; and a temperature sensor 5 which detects the ambient temperature of the ECU 10.

The ECU 10, which includes a CPU, is constituted by a q-axis current computing unit 11, a motor rotation speed computing unit 12, a d-axis current computing unit 13, a dq-converted current limiting value computing unit 14, a d-axis current limiter 15, a q-axis current limiter 16, and an inverter controller 17.

The q-axis current computing unit 11 receives the inputs of a steering torque signal Trq detected by the torque sensor 2, and a vehicle speed signal Vs detected by the vehicle speed sensor, and sets a q-axis current command value Iq. The motor rotation speed computing unit 12 computes the motor rotation speed N per unit time from a rotation angle θ of the motor 1 detected by the resolver sensor 4.

The d-axis current computing unit 13 sets a d-axis current command value Id based on the q-axis current command value Iq which was set by the q-axis current computing unit 11, and the motor rotation speed N per unit time which was computed by the motor rotation speed computing unit 12.

The dq-converted current limiting value computing unit 14 determines a dq-converted current limiting value Idq_LIM, which is a motor current limiting value, based on the ambient temperature T detected by the temperature sensor 5.

The d-axis current limiter 15 limits the d-axis current command value Id, which was set by the d-axis current computing unit 13, using the dq-converted current limiting value Idq_LIM determined by the dq-converted current limiting value computing unit 14. The q-axis current limiter 16 limits the q-axis current command value Iq, which was set by the q-axis current computing unit 11, using a d-axis current command value Id' limited by the d-axis current limiter 15 (hereafter called limited d-axis current command value Id'), and the dq-converted current limiting value Idq_LIM determined by the dq-converted current limiting value computing unit 14.

The inverter controller 17 outputs the three-phase current Iu, Iv and Iw based on a q-axis current command value Iq' limited by the q-axis current limiter 16 (hereafter called limited q-axis current command value Iq'), the limited d-axis current command value Id' limited by the d-axis current limiter 15, and the rotation angle θ of the motor 1 detected by the resolver sensor 4, and drives the motor 1.

Here a case when the maximum value of the motor current is a dq-converted current rated value Idq-MAX and the maximum value of the d-axis current is a d-axis current rated value Id_MAX will be considered. In this case, the d-axis current limiter 15 calculates the d-axis current limiting value Id_LIM according to the following Expression (1), using the dq-converted current limiting value Idq_LIM. Further, the d-axis current limiter 15 calculates the limited d-axis current command value Id' by limiting the d-axis current command value Id to the d-axis current limiting value Id_LIM or less according to the following Expression (2).

$$\mathrm{Id\_LIM} = \mathrm{Id\_MAX} \times \frac{\mathrm{Idq\_LIM}}{\mathrm{Idq\_MAX}} \quad (1)$$

$$\mathit{Id}' = \mathrm{MIN}(\mathit{Id}, \mathrm{Id\_LIM}) \quad (2)$$

Then the q-axis current limiter 16 calculates the q-axis current limiting value (Iq_LIM) according to the following Expression (3), using the limited d-axis current command value Id' and the dq-converted current limiting value Idq_LIM. Further, the q-axis current limiter 16 calculates the limited q-axis current limiting value Iq' by limiting the q-axis current command value Iq' to the q-axis current limiting value Iq_LIM or less according to the following Expression (4).

$$Iq\_LIM = \sqrt{Idq\_LIM^2 - Id^2} \quad (3)$$

$$Iq' = \text{MIN}(Iq, Iq\_LIM) \quad (4)$$

In other words, the ECU 10 of Embodiment 1 computes the current command values according to the following procedure.

(Procedure 1) When the d-axis current command value Id and the q-axis current command value Iq are limited by the dq-converted current limiting value Idq_LIM for any reason, such as overheating protection, the ECU 10 calculates the limited d-axis current command value Id' according to the above Expressions (1) and (2).

(Procedure 2) Then within the dq-converted current limiting value Idq_LIM, the ECU 10 calculates the limited q-axis current command value Iq' according to the above Expressions (3) and (4).

In other words, a technical feature of the electric power steering control apparatus of Embodiment 1 is that the optimum limited q-axis current command value Iq' is calculated after calculating the optimum limited d-axis current command value Id' with priority. As a result, an electric power steering control apparatus, which can implement high followability, can be obtained.

Figure 2:
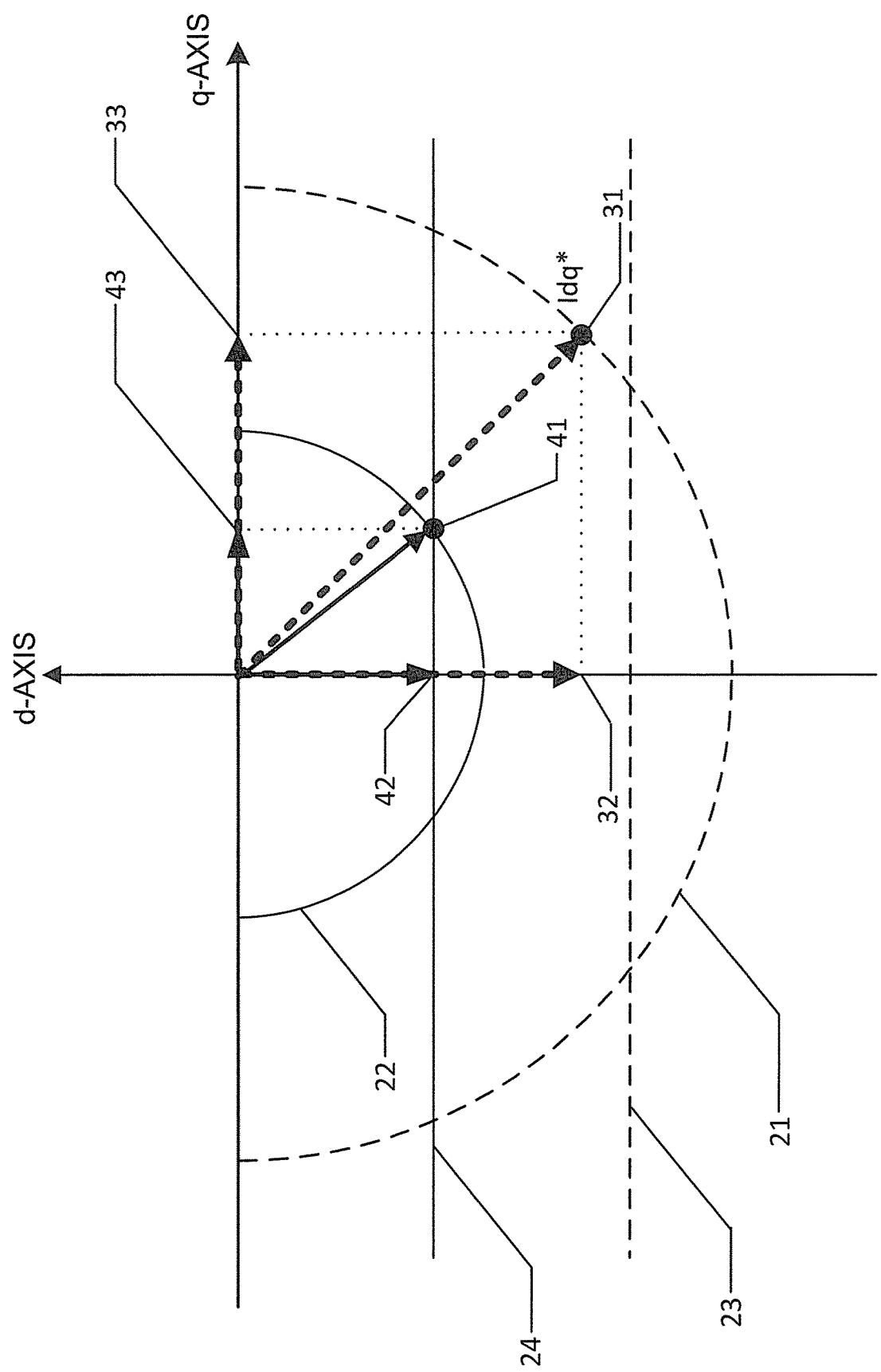
FIG. 2 is a diagram depicting a current limiting method by the electric power steering control apparatus according to Embodiment 1 of this invention.
Figure 3:
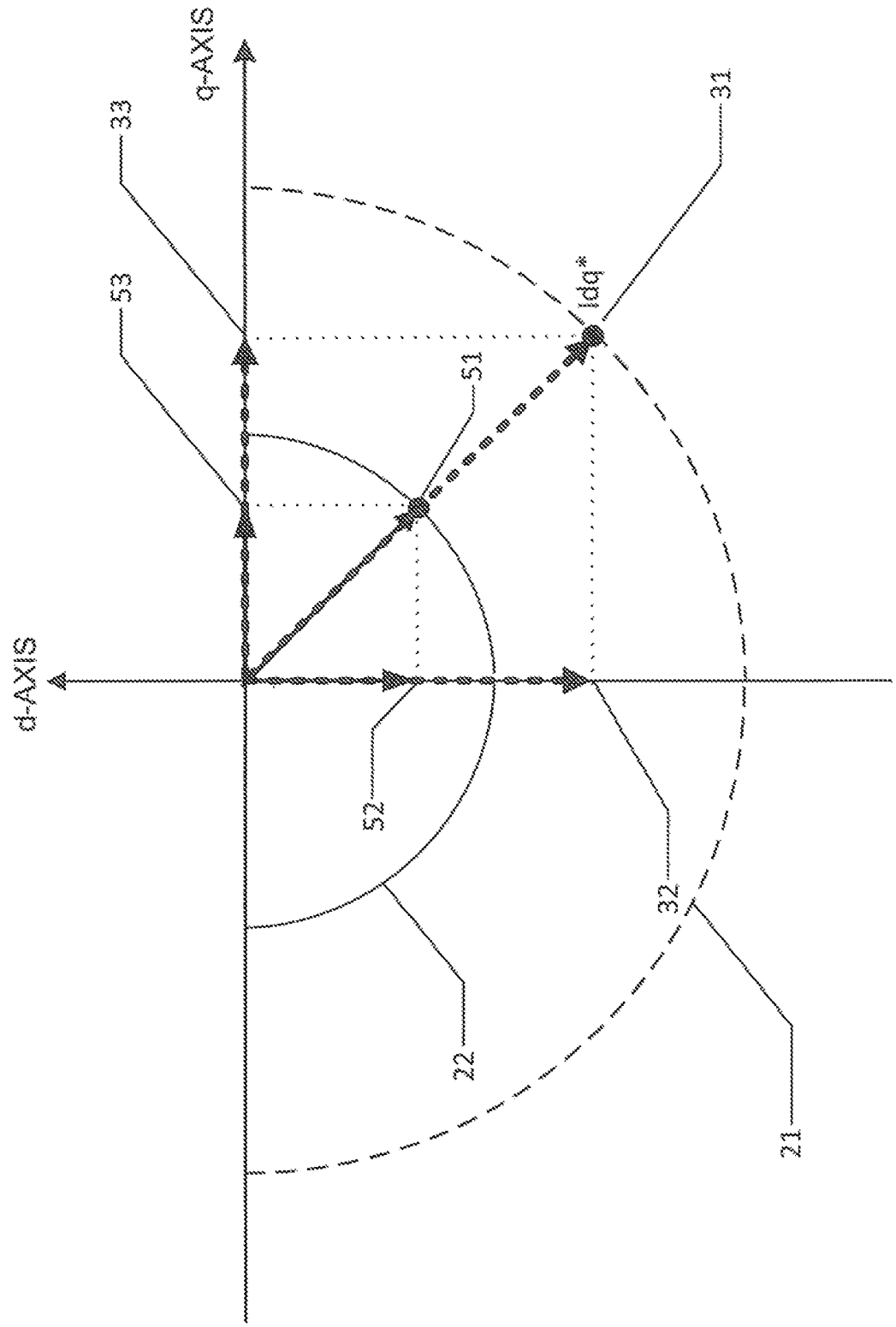
FIG. 3 is a diagram depicting a current limiting method by an electric power steering control apparatus according to PTL 1.

Now the effect obtained by the electric power steering control apparatus of Embodiment 1 will be described in detail, by comparing it with the conventional current limiting method according to PTL 1. FIG. 2 is a diagram depicting the current limiting method by the electric power steering control apparatus according to Embodiment 1 of this invention. FIG. 3, on the other hand, is a diagram depicting the current limiting method by the electric power steering control apparatus according to PTL 1.

FIG. 2, which depicts the current control method according to Embodiment 1, is a vector diagram of motor current, where the abscissa indicates the q-axis current command value, and the ordinate indicates the d-axis current command value, and each reference sign denotes the following.

Semicircle 21: A semicircle when the dq-converted current limiting value Idg_LIM is the rated value Idq_MAX of the dq-converted current command value.

Semicircle 22: A semicircle when the dq-converted current limiting value Idq_LIM is limited to a value smaller than that of the semicircle 21 due to current limitation.

Line 23: A limiting value when the d-axis current limiting value Id_LIM is the rated value Id_MAX of the d-axis current command value.

Line 24: A limiting value when the d-axis current limiting value Id_LIM is a value lower than the line 23 due to current limitation.

Combined vector 31: A dq-converted current command value Idq* generated by combining the q-axis current command value and the d-axis current command value, that is, a combined vector when the magnitude of the vector is the same as the dq-converted current limiting value indicated by the semicircle 21.

d-axis vector 32: A vector which indicates the limited d-axis current command value Id' as a d-axis component corresponding to the combined vector 31.

q-axis vector 33: A vector which indicates the limited q-axis current command value Iq' as a q-axis component corresponding to the combined vector 31.

Combined vector 41: A dq-converted current command value Idq* generated by combining the q-axis current command value and the d-axis current command value, that is, a combined vector when the magnitude of the vector is the same as the dq-converted current limiting value indicated by the semicircle 22.

d-axis vector 42: A vector which indicates the limited d-axis current command value Id' as a d-axis component corresponding to the combined vector 41.

q-axis vector 43: A vector which indicates the limited q-axis current command value Iq' as a q-axis component corresponding to the combined vector 41.

Now the current control method according to Embodiment 1, in the case when the current limitation is activated and the dq-converted current limiting value Idq_LIM drops from the state of the semicircle 21 to the state of the semicircle 22, will be described in details with reference to FIG. 2.

When the dq-converted current limiting value Idq_LIM decreases, the d-axis current limiting value Id_LIM drops from line 23 to the line 24 according to the above Expression (1). As a result, the limited d-axis current command value Id' is calculated according to the above Expression (2), and drops from the vector 32 to the vector 42. In other words, the limited d-axis current command value Id' is calculated with priority.

Then the q-axis current limiting value Iq_LIM is determined according to the above Expression (3), and as a result, the limited q-axis current command value Iq' is calculated according to the above Expression (4), and drops from the vector 33 to the vector 43. Then, finally the current that flows to the motor 1 becomes the combined vector 41 of the vector 42 and the vector 43.

FIG. 3, which depicts the current control method according to PTL 1, on the other hand, is a vector diagram of motor current, where the abscissa indicates the q-axis current command value, and the ordinate indicates the d-axis current command value just like FIG. 2 described above, and each reference sign denotes the following. The reference signs that are the same as FIG. 2 denote the same meanings, for which description is omitted.

Combined vector 51: A dq-converted current command value Idq* generated by combining the q-axis current command value and the d-axis current command value, that is, a combined vector when the magnitude of the vector is the same as the dq-converted current limiting value indicated by the semicircle 22.

d-axis vector 52: A vector which indicates the limited d-axis current command value Id' as a d-axis component corresponding to the combined vector 51.

q-axis vector 53: A vector which indicates the limited q-axis current command value Iq' as a q-axis component corresponding to the combined vector 51.

Now the current control method according to PTL1, in the case when the current limitation is activated and the dq-converted current limiting value Idq_LIM is dropped from the state of the semicircle 21 to the state of the semicircle 22, just like the above mentioned case of FIG. 2, will be described in details with reference to FIG. 3.

In PTL1, the d-axis current command value and the q-axis current command value are decreased at a same rate so that the vector 51, which corresponds to the limited dq-converted current command value, becomes the dq-converted current limiting value which corresponds to the value indicated by the semicircle 22, whereby the vector 52 and the vector 53 are calculated.

Therefore the limited d-axis current command value and the limited q-axis current command value drop as indicated by the vector 52 and the vector 53 respectively, and the combined current of the limited d-axis current command value and the limited q-axis current command value becomes as indicated by the vector 51.

In comparing the results in FIG. 2 and FIG. 3, both the vector 41 and the vector 51, which respectively correspond to the dq-converted current command value, that is, the combined value of the limited d-axis current command value and the limited q-axis current command value, are limited to the value indicated by the semicircle 22.

On the other hand, in comparing the vector 42 and the vector 52, which respectively indicate the limited d-axis current command value Id', the vector 42, when current was limited according to Embodiment 1, is larger, indicating more d-axis current can be supplied, than the vector 52 when current was limited according to PTL1. As a result, the current limiting method according to Embodiment 1 can improve followability more than the current limiting method according to PTL 1.

Figure 4:
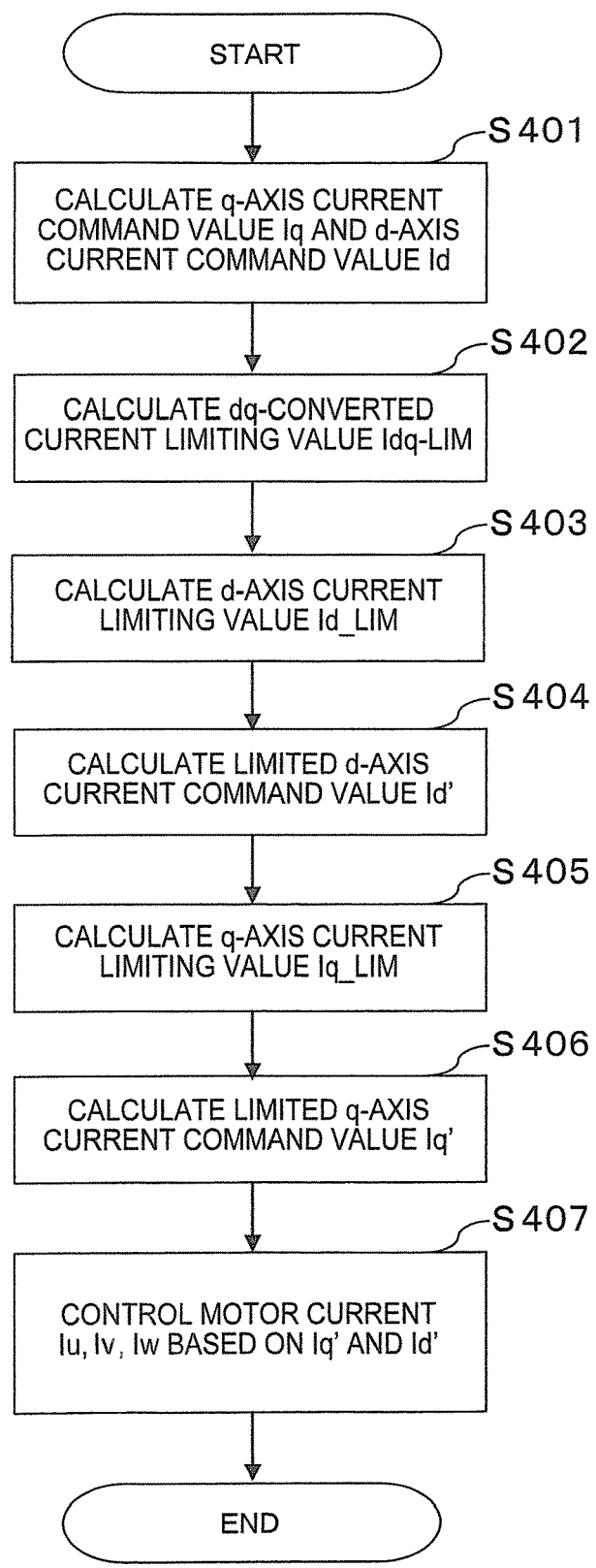
FIG. 4 is a flow chart depicting a series of processing of the electric power steering control method that is executed by an ECU according to Embodiment 1 of this invention.
Figure 5:
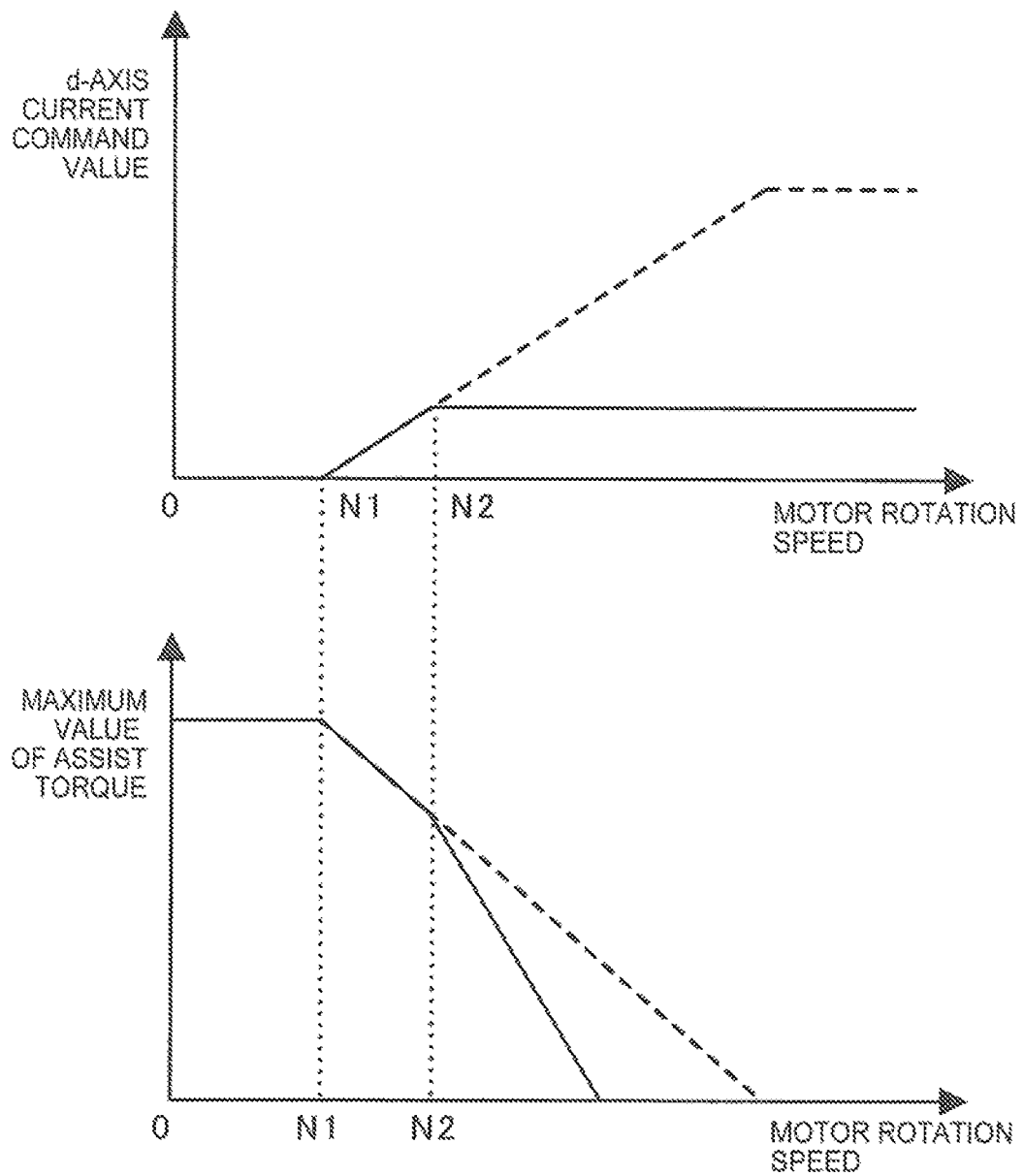
FIG. 5 shows graphs depicting the d-axis current command value with respect to the motor rotation speed, and the maximum value of the assist torque with respect to the motor rotation speed in the conventional electric power steering control apparatus.

FIG. 4 is a flow chart depicting a series of processing of the electric power steering control method executed by the ECU 10 according to Embodiment 1 of this invention. First in step S401, the q-axis current command value Iq is calculated by the q-axis current computing unit 11, and the d-axis current command value Id is calculated by the d-axis current computing unit 13, just like prior art.

Then in step S402, the dq-converted current limiting value computing unit 14 calculates the dq-converted current limiting value Idq_LIM. In the above description on the example based on FIG. 1, the dq-converted current limiting value computing unit 14 determines the dq-converted current limiting value Idq_LIM, which is the limiting value of the motor current, based on the ambient temperature T detected by the temperature sensor 5.

However, the dq-converted current limiting value Idq_LIM need not always be calculated based on the temperature value detected by the temperature sensor 5. The value to limit current of the AC motor to assist steering of the steering wheel in the high-speed steering range may be acquired by the ECU 10 from an outside source, or may be calculated based on other detected values, for which prior art can be applied.

Then in step S403, the d-axis current limiter 15 calculates the d-axis current limiting value Id_LIM using the above Expression (1), based on the dq-converted current limiting value Idq_LIM calculated in step S402. In other words, the d-axis current limiting value Id_LIM is calculated with priority over the q-axis current limiting value Iq_LIM.

Then in step S404, the d-axis current limiter 15 clips the d-axis current command value Id calculated in step S401 using the above Expression (2) to be the d-axis current limiting value Id_LIM, which was calculated in step S403, or less, so as to calculate the limited d-axis current command value Id'.

Then in step S405, the q-axis current limiter 16 calculates the q-axis current limiting value Iq_LIM using the above Expression (3) based on the dq-converted current limiting value Idq_LIM calculated in step S402 and the limited d-axis current command value Id' calculated in step S404.

Further in step S406, the q-axis current limiter 16 clips the q-axis current command value Iq calculated in step S401 using the above Expression (4) to be the q-axis current limiting value Iq_LIM, which was calculated in step S405, or less, so as to calculate the limited q-axis current command value Iq'.

Then finally in step S407, the inverter controller 17 controls the three-phase current Iu, Iv and Iw for driving the motor 1, using the limited d-axis current command value Id' calculated in step S404 and the limited q-axis current command value Iq' calculated in step S406.

In this way, a technical feature of the electrical power steering control method according to Embodiment 1 is that the limited q-axis current command value Iq' is determined after determining the limited d-axis current command value Id' with priority in step S403 to step S406. As a result, followability can be improved more than prior art when current to the AC motor to assist steering of the steering wheel is limited in the high-speed steering region.

As described above, according to Embodiment 1, when current is limited when steering the steering wheel, the d-axis current command value can be output if the d-axis current command value is the d-axis current limiting value or less, regardless the limiting rate of the q-axis current command value, and the d-axis current command value can be calculated with priority over the q-axis current command value. As a result, compared with the prior art, the d-axis current command value is not limited in the high rotation region of the AC motor, and the followability can be improved to the maximum.

The invention claimed is:

1. An electric power steering control apparatus comprising a main controller configured to control motor current for driving an AC motor assisting steering of a steering wheel, based on a d-axis current command value and a q-axis current command value, wherein
the main controller includes, when a dq-converted current command value, which is a root-sum-square of the d-axis current command value and the q-axis current command value, is limited:
a d-axis current limiter configured to calculate a d-axis current limiting value with priority, based on a dq-converted current limiting value, which is a limiting value of the dq-converted current command value, and calculate a limited d-axis current command value by clipping the d-axis current command value to be the d-axis current limiting value or less;
a q-axis current limiter configured to calculate a q-axis current limiting value based on the dq-converted current limiting value and the limited d-axis current command value calculated by the d-axis current limiter, and calculate a limited q-axis current command value by clipping the q-axis current command value to be the q-axis current limiting value or less; and
an inverter controller configured to control the motor current, based on the limited d-axis current command value and the limited q-axis current command value.

2. The electric power steering control apparatus according to claim 1, wherein
the d-axis current limiter calculates the d-axis current limiting value using the following expression, $$Id\_LIM = Id\_MAX \times (Idq\_LIM / Idq\_MAX)$$

where
Id_MAX denotes a d-axis current rated value,
Idq_MAX denotes a dq-converted current rated value,
Idq_LIM denotes the dq-converted current limiting value, and
Id_LIM denotes the d-axis current limiting value.

3. The electric power steering control apparatus according to claim 2, wherein
the q-axis current limiter calculates the q-axis current limiting value using the following expression, $$Iq\_LIM = \sqrt{\{(Idq\_LIM)^2 - (Id')^2\}}$$

where

Id' denotes the limited d-axis current command value calculated by the d-axis current limiter, Idq_LIM denotes the dq-converted current limiting value, and Iq_LIM denotes the q-axis current limiting value.

4. The electric power steering control apparatus according to claim 3, wherein
the main controller includes:
a temperature sensor configured to measure an ambient temperature of the main controller; and
a limiting value computing unit configured to determine the dq-converted current limiting value for overheating protection, based on the ambient temperature measured by the temperature sensor.

5. The electric power steering control apparatus according to claim 2, wherein
the main controller includes:
a temperature sensor configured to measure an ambient temperature of the main controller; and
a limiting value computing unit configured to determine the dq-converted current limiting value for overheating protection, based on the ambient temperature measured by the temperature sensor.

6. The electric power steering control apparatus according to claim 1, wherein
the q-axis current limiter calculates the q-axis current limiting value using the following expression, $$Iq\_LIM = \sqrt{(Idq\_LIM)^2 - (Id')^2}$$

where

Id' denotes the limited d-axis current command value calculated by the d-axis current limiter, Idq_LIM denotes the dq-converted current limiting value, and Iq_LIM denotes the q-axis current limiting value.

7. The electric power steering control apparatus according to claim 6, wherein
the main controller includes:
a temperature sensor configured to measure an ambient temperature of the main controller; and
a limiting value computing unit configured to determine the dq-converted current limiting value for overheating protection, based on the ambient temperature measured by the temperature sensor.

8. An electric power steering control apparatus comprising a main controller configured to control motor current for driving an AC motor assisting steering of a steering wheel, based on a d-axis current command value and a q-axis current command value, wherein
the main controller includes:
a temperature sensor configured to measure an ambient temperature of the main controller;
a limiting value computing unit configured to determine a dq-converted current limiting value for overheating protection, based on the ambient temperature measured by the temperature sensor;
a d-axis current limiter configured to calculate a d-axis current limiting value with priority, based on a dq-converted current limiting value, which is a limiting value of the dq-converted current command value, and calculate a limited d-axis current command value by clipping the d-axis current command value to be the d-axis current limiting value or less,
a q-axis current limiter configured to calculate a q-axis current limiting value based on the dq-converted current limiting value and the limited d-axis current command value calculated by the d-axis current limiter, and calculate a limited q-axis current command value by clipping the q-axis current command value to be the q-axis current limiting value or less; and
an inverter controller configured to control the motor current, based on the limited d-axis current command value and the limited q-axis current command value.

9. An electric power steering control method executed by a main controller controlling motor current for driving an AC motor assisting steering of a steering wheel, based on a d-axis current command value and a q-axis current command value, the method comprising: by the main controller, when a dq-converted current command value, which is a root-sum-square of the d-axis current command value and the q-axis current command value, is limited;
a first step of acquiring a dq-converted current limiting value, which is a limiting value of the dq-converted current command value;
a second step of calculating a d-axis current limiting value with priority, based on the dq-converted current limiting value acquired in the first step;
a third step of calculating a limited d-axis current command value by clipping the d-axis current command value to be not more than the d-axis current limiting value, which has been calculated in the second step;
a fourth step of calculating a q-axis current limiting value based on the dq-converted current limiting value acquired in the first step and the limited d-axis current command value calculated in the third step;
a fifth step of calculating a limited q-axis current command value by clipping the q-axis current command value to be not more than the q-axis current limiting value, which has been calculated in the fourth step; and
a sixth step of controlling the motor current, based on the limited d-axis current command value, which has been calculated in the third step, and the limited q-axis current command value, which has been calculated in the fifth step.

* * * * *